UNITED STATES PATENT OFFICE.

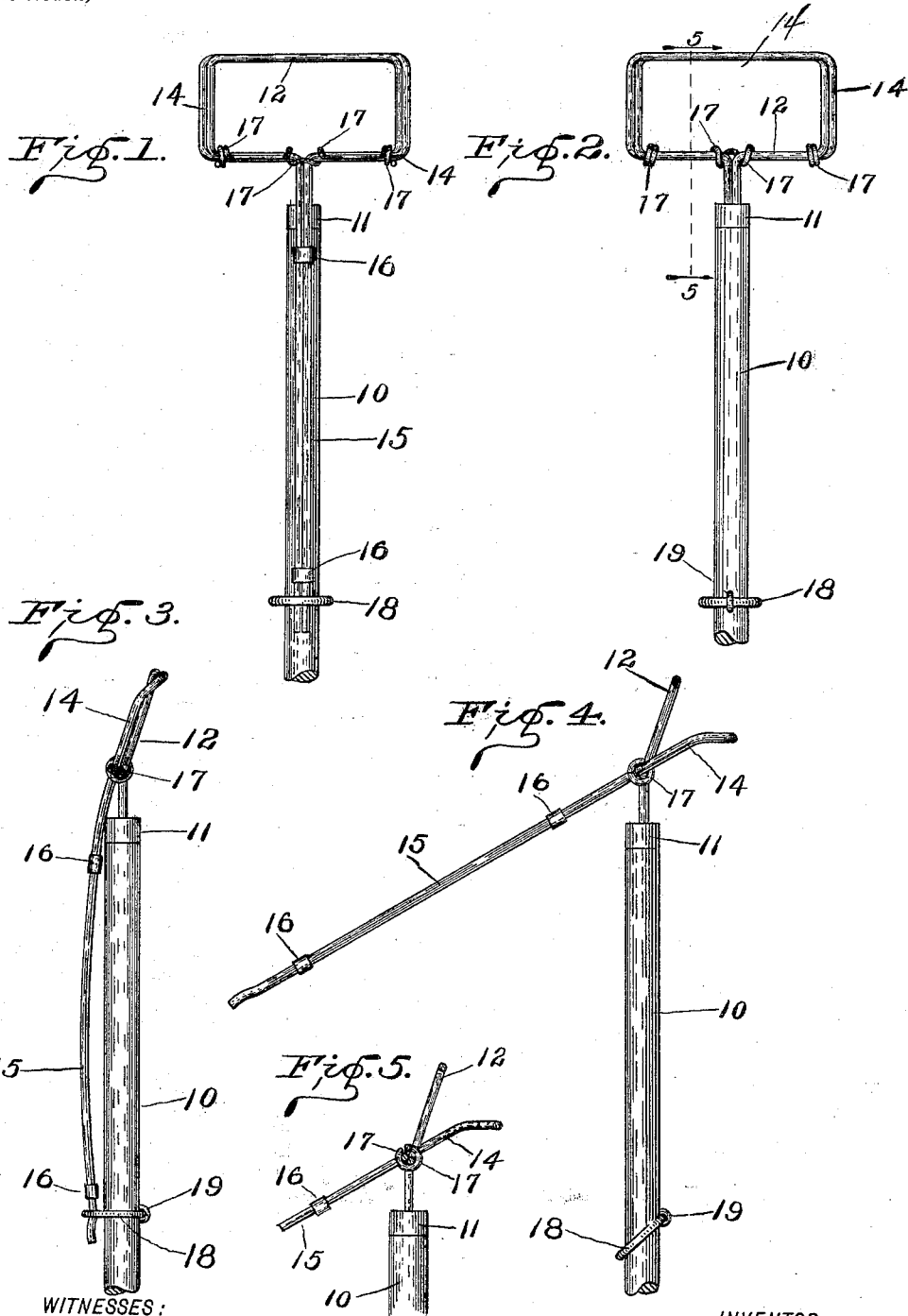

HARRY G. HUNTINGTON, OF LADOGA, INDIANA.

CLEANING IMPLEMENT.

SPECIFICATION forming part of Letters Patent No. 695,315, dated March 11, 1902.

Application filed May 23, 1901. Serial No. 61,559. (No model.)

*To all whom it may concern:*

Be it known that I, HARRY G. HUNTINGTON, a citizen of the United States, residing at Ladoga, in the county of Montgomery and State of Indiana, have invented certain new and useful Improvements in Cleaning Implements, of which the following is a specification.

The object of my said invention is to provide a simple, inexpensive, and easily-manipulated handle for dusters, window-washers, mops, or such like cleaning implements or household appliances, which will be hereinafter more particularly described and claimed.

Referring to the accompanying drawings, which are made a part hereof, and on which similar reference characters indicate corresponding parts, Figure 1 is a rear elevation of the upper end of a cleaner-handle embodying my said invention; Fig. 2, a front elevation thereof; Fig. 3, a side elevation of the same; Fig. 4, a side elevation similar to Fig. 3, except that the movable jaw is released and swung outwardly, the jaws being thus in position to receive the cleaning fabric; and Fig. 5, a detail sectional view as seen when looking in the direction indicated by the arrows from the dotted line 5 5 in Fig. 2, but with the jaws swung open, as in Fig. 4.

The handle 10 is preferably an ordinary turned wooden handle provided with a ferrule 11, as is usual in handles for such purposes. The stationary jaw 12 of the implement is composed of a piece of wire bent around into a proper shape, preferably substantially rectangular, the ends of said wire being brought together and forming a shank 13, which enters a longitudinal perforation in the upper end of the handle 10. Said handle is prevented from splitting when said shank is driven in by the ferrule 11. This main clamping-jaw may stand in any position desired, but is more convenient for most purposes if bent off at something of an angle, as shown in Figs. 3, 4, and 5.

The clamping-jaw 14, like the jaw 12, is formed of wire and is bent into much the same shape. The ends, however, where brought together, instead of forming a shank and entering the handle 10, are prolonged and form a lever-handle 15, by means of which the opening and closing of the jaws is accomplished. These wires are held together by any desired means, as by bands 16.

The lower horizontal members of the two jaws lie alongside each other and are secured together by a hinging loop-wire 17, which is coiled about them, preferably in the middle and at both ends, as best shown in Fig. 1. This hinging-wire is bent in a peculiar form. It is first bent across the wire forming the movable jaw 14 and its handle 15 close to the point where the handle develops out of the jaw, thence up around the horizontal portion of the stationary jaw, where it develops into its shank, thence outwardly parallel with the horizontal portions of said two jaws to near their ends in both directions, and there coiled about said horizontal portions close to said outer ends.

At a suitable point on the main handle 10 is a keeper 18. This keeper is preferably in the form of a small ring, and the means of securing the same in place is preferably an ordinary staple 19. Said keeper is adapted to be swung over the end of the handle portion 15, as best shown in Fig. 3, thus bringing the two jaws firmly together and holding whatever cleaning fabric has been placed between them firmly and securely in place. In bringing this handle portion down to this position it first comes in contact with the upper edge of the ferrule 11, which forms a fulcrum, so that the handle to the clamping-jaw acts as a spring-lever, as will be readily understood. The extreme ends of the wires forming this handle are bent outwardly slightly, as shown, thus aiding in holding the keeper in place when in the position shown when the jaws are brought together.

Having thus fully described my said invention, what I claim as new, and desire to secure by Letters Patent, is—

1. The combination, in a cleaning implement, of a main handle, a stationary jaw formed of wire the ends whereof are brought together and rigidly attached to the implement-handle, a cleaning-jaw also formed of wire and bent into similar shape as the stationary jaw, the ends of the wire whereof it is formed extending out and forming an operating-handle therefor, and a hinging-wire bent around the parallel inner members of the said two jaws at the central and outer portions thereof and thus connecting them together at said points, substantially as shown and described.

2. The combination in a cleaning implement of a handle, a stationary jaw rigidly connected thereto and formed of wire bent into a suitable shape, the inner member extending at substantially right angles with the handles, the clamping-jaw also formed of wire and bent into similar shape, and a hinging-wire connecting two parallel members of said jaws together, said hinging-wire being first bent back around the handle portion of the clamping-jaw close to its head, thence up around the adjacent portion of the stationary jaw, thence outwardly parallel with the adjacent portions of the two jaws to near their ends, and there coiled around said two portions, substantially as shown and described.

In witness whereof I have hereunto set my hand and seal, at Ladoga, Indiana, this 18th day of May, A. D. 1901.

HARRY G. HUNTINGTON. [L. S.]

Witnesses:
E. J. HUBBARD,
J. F. WARFEL.